US012112755B2

(12) United States Patent
Aharoni et al.

(10) Patent No.: US 12,112,755 B2
(45) Date of Patent: *Oct. 8, 2024

(54) AUTOMATED CALLING SYSTEM

(71) Applicant: GOOGLE LLC, Mountain View, CA (US)

(72) Inventors: Asaf Aharoni, Ramat Hasharon (IL); Eyal Segalis, Tel Aviv (IL); Yaniv Leviathan, New York, NY (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/940,732

(22) Filed: Sep. 8, 2022

(65) Prior Publication Data

US 2023/0005482 A1 Jan. 5, 2023

Related U.S. Application Data

(63) Continuation of application No. 17/049,689, filed as application No. PCT/US2020/031507 on May 5, 2020, now Pat. No. 11,468,893.

(Continued)

(51) Int. Cl.
*G10L 15/22* (2006.01)
*H04M 3/51* (2006.01)

(52) U.S. Cl.
CPC ......... *G10L 15/222* (2013.01); *H04M 3/5158* (2013.01); *H04M 2201/39* (2013.01); *H04M 2201/40* (2013.01)

(58) Field of Classification Search
CPC . G10L 15/222; G10L 25/78; G10L 2015/223; G10L 13/08; G10L 15/26;

(Continued)

(56) References Cited

U.S. PATENT DOCUMENTS 5,315,636 A 5/1994 Patel
5,333,133 A * 7/1994 Andrews .............. H04Q 3/0016
379/212.01

(Continued)

FOREIGN PATENT DOCUMENTS

CN 103795877 5/2014
CN 105592237 5/2016

(Continued)

OTHER PUBLICATIONS

China National Intellectual Property Administration; Notification of Second Office Action issued in Application No. 202080014243.4; 15 pages; dated Jun. 30, 2023.

(Continued)

*Primary Examiner* — Akelaw Teshale
(74) *Attorney, Agent, or Firm* — Gray Ice Higdon

(57) ABSTRACT

Methods, systems, and apparatus for an automated calling system are disclosed. Some implementations are directed to using a bot to initiate telephone calls and conduct telephone conversations with a user. The bot may be interrupted while providing synthesized speech during the telephone call. The interruption can be classified into one of multiple disparate interruption types, and the bot can react to the interruption based on the interruption type. Some implementations are directed to determining that a first user is placed on hold by a second user during a telephone conversation, and maintaining the telephone call in an active state in response to determining the first user hung up the telephone call. The first user can be notified when the second user rejoins the call, and a bot associated with the first user can notify the first user that the second user has rejoined the telephone call.

17 Claims, 5 Drawing Sheets

Related U.S. Application Data

(60) Provisional application No. 62/843,660, filed on May 6, 2019.

(58) Field of Classification Search
CPC ...... G10L 15/22; G10L 15/04; H04M 3/5158; H04M 2201/39; H04M 2201/40; H04M 3/527; H04M 3/4936; H04M 2201/16; H04M 3/42

See application file for complete search history.

(56) References Cited

U.S. PATENT DOCUMENTS

| | | | |
|---|---|---|---|
| 5,815,566 A | 9/1998 | Ramot et al. | |
| 5,946,378 A * | 8/1999 | Farfan | H04M 3/428 379/212.01 |
| 6,304,653 B1 | 10/2001 | O'Neil et al. | |
| 6,377,567 B1 | 4/2002 | Leonard | |
| 6,574,595 B1 | 6/2003 | Mitchell et al. | |
| 6,731,725 B1 | 5/2004 | Merwin et al. | |
| 6,882,973 B1 | 4/2005 | Pickering | |
| 6,922,465 B1 | 7/2005 | Howe | |
| 7,084,758 B1 | 8/2006 | Cole | |
| 7,337,158 B2 | 2/2008 | Fratkina et al. | |
| 7,539,656 B2 | 5/2009 | Fratkina et al. | |
| 7,587,031 B1 * | 9/2009 | Ress | H04M 7/006 379/46 |
| 7,792,773 B2 | 9/2010 | McCord et al. | |
| 7,920,678 B2 | 4/2011 | Cooper et al. | |
| 7,974,610 B2 * | 7/2011 | Nachum | H04Q 3/0079 455/423 |
| 8,345,835 B1 | 1/2013 | Or-Bach et al. | |
| 8,594,308 B2 | 11/2013 | Soundar | |
| 8,619,965 B1 | 12/2013 | Figa et al. | |
| 8,938,058 B2 | 1/2015 | Soundar | |
| 8,964,963 B2 | 2/2015 | Soundar | |
| 9,232,369 B1 | 1/2016 | Fujisaki | |
| 9,318,108 B2 | 4/2016 | Gruber et al. | |
| 9,467,566 B2 | 10/2016 | Soundar | |
| 9,473,637 B1 | 10/2016 | Venkatapathy et al. | |
| 2002/0051522 A1 | 5/2002 | Merrow et al. | |
| 2002/0055975 A1 | 5/2002 | Petrovykh | |
| 2003/0009530 A1 | 1/2003 | Philonenko et al. | |
| 2003/0063732 A1 | 4/2003 | Mcknight | |
| 2003/0083874 A1 | 5/2003 | Crane et al. | |
| 2003/0215066 A1 | 11/2003 | Shambaugh et al. | |
| 2004/0001575 A1 | 1/2004 | Tang | |
| 2004/0083195 A1 | 4/2004 | McCord et al. | |
| 2004/0213384 A1 | 10/2004 | Alles et al. | |
| 2004/0240642 A1 | 12/2004 | Crandell et al. | |
| 2005/0147227 A1 | 7/2005 | Chervirala et al. | |
| 2005/0175168 A1 | 8/2005 | Summe et al. | |
| 2005/0267759 A1 | 12/2005 | Jeschke et al. | |
| 2005/0271250 A1 | 12/2005 | Vallone et al. | |
| 2006/0023859 A1 * | 2/2006 | Crockett | H04M 3/46 379/212.01 |
| 2006/0039365 A1 | 2/2006 | Ravikumar et al. | |
| 2006/0056600 A1 | 3/2006 | Merrow et al. | |
| 2006/0215824 A1 | 9/2006 | Mitby et al. | |
| 2007/0036320 A1 | 2/2007 | Mandalia et al. | |
| 2007/0047711 A1 * | 3/2007 | Florkey | H04M 3/4285 379/162 |
| 2007/0201664 A1 | 8/2007 | Salafia | |
| 2008/0118047 A1 * | 5/2008 | Nachum | H04Q 3/0079 379/210.01 |
| 2008/0158000 A1 | 7/2008 | Mattrazzo | |
| 2008/0181371 A1 | 7/2008 | Merrow et al. | |
| 2008/0209449 A1 | 8/2008 | Maehira | |
| 2008/0309449 A1 | 12/2008 | Martin et al. | |
| 2008/0317234 A1 | 12/2008 | Di Fabbrizio et al. | |
| 2009/0022293 A1 | 1/2009 | Routt | |
| 2009/0029674 A1 | 1/2009 | Brezina et al. | |
| 2009/0089096 A1 | 4/2009 | Schoenberg | |
| 2009/0089100 A1 | 4/2009 | Nenov et al. | |
| 2009/0112595 A1 | 4/2009 | Ljolje | |
| 2009/0136014 A1 | 5/2009 | Bigue et al. | |
| 2009/0137278 A1 | 5/2009 | Haru et al. | |
| 2009/0232295 A1 | 9/2009 | Ryskamp | |
| 2010/0088613 A1 | 4/2010 | DeLuca et al. | |
| 2010/0104087 A1 | 4/2010 | Byrd et al. | |
| 2010/0124325 A1 | 5/2010 | Weng et al. | |
| 2010/0228590 A1 | 9/2010 | Muller et al. | |
| 2010/0303227 A1 * | 12/2010 | Gupta | H04M 1/247 379/266.06 |
| 2011/0092187 A1 | 4/2011 | Miller | |
| 2011/0270687 A1 | 11/2011 | Bazaz | |
| 2012/0016678 A1 | 1/2012 | Gruber et al. | |
| 2012/0109759 A1 | 5/2012 | Oren et al. | |
| 2012/0147762 A1 | 6/2012 | Hancock et al. | |
| 2012/0157067 A1 | 6/2012 | Turner et al. | |
| 2012/0173243 A1 | 7/2012 | Anand et al. | |
| 2012/0271676 A1 | 10/2012 | Aravamudan et al. | |
| 2013/0060587 A1 | 3/2013 | Bayrak et al. | |
| 2013/0077772 A1 | 3/2013 | Lichorowic et al. | |
| 2013/0090098 A1 | 4/2013 | Gidwani | |
| 2013/0136248 A1 | 5/2013 | Kaiser-Nyman et al. | |
| 2013/0163741 A1 | 6/2013 | Balasaygun et al. | |
| 2013/0275164 A1 | 10/2013 | Gruber et al. | |
| 2014/0006032 A1 | 1/2014 | Korn | |
| 2014/0024362 A1 | 1/2014 | Kang et al. | |
| 2014/0029734 A1 | 1/2014 | Kim et al. | |
| 2014/0037084 A1 | 2/2014 | Dutta | |
| 2014/0107476 A1 | 4/2014 | Tung et al. | |
| 2014/0122077 A1 | 5/2014 | Nishikawa et al. | |
| 2014/0122618 A1 | 5/2014 | Duan | |
| 2014/0200928 A1 | 7/2014 | Watanabe et al. | |
| 2014/0207882 A1 | 7/2014 | Joo et al. | |
| 2014/0247933 A1 | 9/2014 | Soundar | |
| 2014/0279050 A1 | 9/2014 | Makar et al. | |
| 2014/0280464 A1 | 9/2014 | De Ding et al. | |
| 2014/0310365 A1 | 10/2014 | Sample et al. | |
| 2015/0139413 A1 | 5/2015 | Hewitt et al. | |
| 2015/0142704 A1 | 5/2015 | London | |
| 2015/0150019 A1 | 5/2015 | Sheaffer et al. | |
| 2015/0163610 A1 | 6/2015 | Sampat et al. | |
| 2015/0189089 A1 | 7/2015 | Iltus | |
| 2015/0237203 A1 | 8/2015 | Siminoff | |
| 2015/0248817 A1 | 9/2015 | Steir et al. | |
| 2015/0281446 A1 | 10/2015 | Milstein et al. | |
| 2015/0339707 A1 | 11/2015 | Harrison et al. | |
| 2015/0347399 A1 | 12/2015 | Aue et al. | |
| 2015/0350331 A1 | 12/2015 | Kumar | |
| 2015/0358790 A1 | 12/2015 | Nasserbakht | |
| 2016/0021247 A1 | 1/2016 | Marimuthu et al. | |
| 2016/0028891 A1 | 1/2016 | Pirat et al. | |
| 2016/0105546 A1 | 4/2016 | Keys et al. | |
| 2016/0139998 A1 | 5/2016 | Dunn et al. | |
| 2016/0198045 A1 | 7/2016 | Kulkarni et al. | |
| 2016/0227033 A1 | 8/2016 | Song | |
| 2016/0227034 A1 | 8/2016 | Kulkarni et al. | |
| 2016/0277569 A1 | 9/2016 | Shine et al. | |
| 2016/0379230 A1 | 12/2016 | Chen | |
| 2017/0037084 A1 | 2/2017 | Fasan | |
| 2017/0039194 A1 | 2/2017 | Tschetter | |
| 2017/0061091 A1 | 3/2017 | McElhinney et al. | |
| 2017/0094052 A1 | 3/2017 | Zhang et al. | |
| 2017/0177298 A1 | 6/2017 | Hardee et al. | |
| 2017/0180499 A1 | 6/2017 | Gelfenbeyn et al. | |
| 2017/0289332 A1 | 10/2017 | Lavian et al. | |
| 2017/0358296 A1 | 12/2017 | Segalis et al. | |
| 2017/0359463 A1 | 12/2017 | Segalis et al. | |
| 2017/0359464 A1 | 12/2017 | Segalis et al. | |
| 2017/0365277 A1 | 12/2017 | Park | |
| 2018/0124255 A1 | 5/2018 | Kawamura et al. | |
| 2018/0133900 A1 | 5/2018 | Breazeal et al. | |
| 2018/0220000 A1 | 8/2018 | Segalis et al. | |
| 2018/0227416 A1 | 8/2018 | Segalis et al. | |
| 2018/0227417 A1 | 8/2018 | Segalis et al. | |
| 2018/0227418 A1 | 8/2018 | Segalis et al. | |
| 2019/0281159 A1 | 9/2019 | Segalis et al. | |
| 2019/0306314 A1 | 10/2019 | Segalis et al. | |

(56) References Cited

U.S. PATENT DOCUMENTS

| | | |
|---|---|---|
| 2020/0042597 A1 | 2/2020 | Wu |
| 2021/0335365 A1 | 10/2021 | Aharoni et al. |

FOREIGN PATENT DOCUMENTS

| | | | |
|---|---|---|---|
| CN | 109040485 | 12/2018 | |
| EP | 1679693 | 7/2006 | |
| JP | 2003535508 | 11/2003 | |
| JP | 2004508748 | 3/2004 | |
| JP | 2007219385 | 8/2007 | |
| JP | 2007524928 | 8/2007 | |
| JP | 2008015439 | 1/2008 | |
| JP | 2009210703 | 9/2009 | |
| JP | 2012073361 | 4/2012 | |
| JP | 2015070371 | 2/2015 | |
| JP | 2019047493 | 3/2019 | |
| KR | 20130099423 | 9/2013 | |
| KR | 20140121105 | 10/2014 | |
| WO | 9625733 | 8/1996 | |
| WO | 2007065193 | 6/2007 | |
| WO | WO-2010028327 A2 * | 3/2010 | .......... H04M 3/4286 |
| WO | 2017218560 | 12/2017 | |
| WO | 2020227313 | 5/2020 | |

OTHER PUBLICATIONS

Japanese Patent Office; Notice of Allowance issued in App. No. 2021-544219, 3 pages, dated Sep. 26, 2022.

Japanese Patent Office; Notice of Reasons for Rejection issued in App. No. 2021-544219, 10 pages, dated Aug. 1, 2022.

Intellectual Property India; Examination Report issued in Application No. IN202127039839; 6 pages; dated Mar. 10, 2022.

Crook, N. et al.; "Generating Context-Sensitive ECA Responses to User Barge-In Interruptions;" Journal on Multimodal User Interfaces; Springer-Verlag; vol. 6, No. 1-2; pp. 13-25; Apr. 14, 2012.

Kaspar, B. et al., "Barge-In Revised;" 5th European Conference on Speech Communication and Technology; Eurospeech '97; Greece; pp. 673-676; Sep. 22, 1997.

European Patent Office; Invitation to Pay Additional Fees issued in PCT Ser. No. PCT/US2020/031507; 13 pages; dated Jul. 21, 2020.

European Patent Office; International Search Report and Written Opinion issued in PCT Ser. No. PCT/US2020/031507; 18 pages; dated Sep. 11, 2020.

China National Intellectual Property Administration; Notification of First Office Action issued in Application No. 202080014243.4; 18 pages; dated Dec. 5, 2022.

Intellectual Property India; Hearning Notice issued for Application No. 202127039839, 3 pages, dated Feb. 23, 2024.

Japanese Patent Office; Notice of Reasons for Rejection issued in App. No. 2022-165657; 5 pages; dated Nov. 6, 2023.

European Patent Office; Communication pursuant to Article 94(3) EPC issued in Application No. 20730159.9; 5 pages; dated Oct. 18, 2023.

The Korean Intellectual Property Office; Notice of Office Action issued in Application No. 1020217025719; 12 pages; dated May 22, 2024.

* cited by examiner

AUTOMATED CALLING SYSTEM

BACKGROUND

Users may need to collect types of information that is not easily obtained without human interaction. For example, in order to verify or collect data from multiple places of business or organizations, a user may need to call each of the businesses or organizations in order to gather the information. While web search engines can assist users with such tasks by providing contact information for a service or business, the user must still call the service or business themselves to complete the task themselves.

In order to maintain a database of information gathered from multiple places of business or organizations, a human operator can initiate automated calls to large numbers of businesses to collect data, but selecting the callees (e.g., all restaurants in a particular town that serve the same cuisine) and placing the calls can be time-consuming when performed manually. Moreover, determining when and whether to place the calls generally requires human analysis of existing data in order to identify a need for verification, updating, or supplemental information.

Users may also wish to perform tasks such as make appointments or hire a service. However, there is generally a person with whom a user must interact to complete the desired task. For example, a user may be required to call and speak with a hostess in order to make a reservation at a small restaurant that does not have a website. In some cases, even when users place the calls themselves, they may encounter automated phone trees that often accept only a limited set of user responses.

SUMMARY

Some implementations are directed to using a bot to initiate telephone calls and conduct telephone conversations with a user. The bot may be interrupted while providing synthesized speech during the telephone call. The interruption can be classified into one of multiple disparate interruption types, and the bot can react to the interruption based on the interruption type. Some implementations are directed to determining that a first user is placed on hold by a second user during a telephone conversation, and maintaining the telephone call in an active state in response to determining the first user hung up the telephone call. The first user can be notified when the second user rejoins the call, and a bot associated with the first user can notify the first user that the second user has rejoined the telephone call.

In some implementations, a method implemented by one or more processors is provided, and includes initiating a telephone call with a user using a bot that is configured to initiate telephone calls and conduct telephone conversations, and providing, for output at a corresponding computing device of the user, synthesized speech of the bot. The method further includes, while providing the synthesized speech of the bot, receiving, from the user, a user utterance that interrupts the synthesized speech the bot, in response to receiving the user utterance that interrupts the synthesized speech, classifying the received user utterance as a given type of interruption of multiple disparate types of interruptions, and determining, based on the given type of interruption, whether to continue providing, for output at the corresponding computing device of the user, the synthesized speech of the bot.

These and other implementations of technology disclosed herein can optionally include one or more of the following features.

In some implementations, the given type of interruption is a non-meaningful interruption. Classifying the received user utterance as the non-meaningful interruption includes processing audio data corresponding to the received user utterance or a transcription corresponding to the received user utterance to determine that the received user utterance includes one or more of: background noise, affirmation words or phrases, or filler words or phrases, and classifying the received user utterance as the non-meaningful interruption based on determining that the received user utterance includes one or more of: background noise, affirmation words or phrases, or filler words or phrases.

In some versions of those implementations, determining whether to continue providing the synthesized speech of the bot includes determining to continue providing the synthesized speech of the bot based on classifying the received user utterance as the non-meaningful interruption.

In some implementations, the given type of interruption is a non-critical meaningful interruption. Classifying the received user utterance as the non-critical meaningful interruption includes processing audio data corresponding to the received user utterance or a transcription corresponding to the received user utterance to determine that the received user utterance includes a request for information that is known by the bot, and that is yet to be provided, and classifying the received user utterance as the non-critical meaningful interruption based on determining that the received user utterance includes the request for the information that is known by the bot, and that is yet to be provided.

In some versions of those implementations, determining whether to continue providing the synthesized speech of the bot includes, based on classifying the user utterance as the non-critical meaningful interruption, determining a temporal point in a remainder portion of the synthesized speech to cease providing, for output, the synthesized speech of the bot, determining whether the remainder portion of the synthesized speech is responsive to the received utterance, and in response to determining that the remainder portion is not responsive to the received user utterance: providing, for output, an additional portion of the synthesized speech that is responsive to the received user utterance, and that is yet to be provide, and after providing, for output, the additional portion of the synthesized speech, continuing providing, for output, the remainder portion of the synthesized speech of the bot from the temporal point.

In some further versions of those implementations, the method further includes, in response to determining that the remainder portion is responsive to the received user utterance, continuing providing, for output, the remainder portion of the synthesized speech of the bot from the temporal point.

In some implementations, the given type of interruption is a critical meaningful interruption. Classifying the received user utterance as the critical meaningful interruption includes processing audio data corresponding to the received user utterance or a transcription corresponding to the received user utterance to determine that the received user utterance includes a request for the bot to repeat the synthesized speech or a request to place the bot on hold, and classifying the received user utterance as the non-critical meaningful interruption based on determining that the received user utterance includes the request for the bot to repeat the synthesized speech or the request to place the bot on hold.

In some versions of those implementations, determining whether to continue providing the synthesized speech of the bot includes providing, for output, a remainder portion of a current word or term of the synthesized speech of the bot, and after providing, for output, the remainder portion of the current word or term, cease providing, for output, the synthesized speech of the bot.

In some implementations, classifying the received user utterance as the given type of interruption includes processing audio data corresponding to the received user utterance or a transcription corresponding to the received user utterance using a machine learning model to determine the given type of interruption.

In some versions of those implementations, the method further includes training the machine learning model using a plurality of training instances. Each of the training instances include training instance input and corresponding training instance output, each training instance input including training audio data corresponding to an interruption utterance or a transcription corresponding to the interruption utterance, and each corresponding training instance output including a ground truth label corresponding the type of interruption included in the interruption utterance. In some further versions of those implementations, processing the audio data corresponding to the received user utterance or the transcription corresponding to the received user utterance using the machine learning model further includes processing the synthesized speech being output when the user utterance was received along with the audio data or the transcription.

In some implementations, classifying the received user utterance as the given type of interruption includes processing audio data corresponding to the received user utterance or a transcription corresponding to the received user utterance using one or more rules that match tokens of the received user utterance to one or more terms associated with each of the multiple disparate interruption types.

In some implementations, initiating the telephone call with the user using the bot is responsive to receiving user input, from a given user associated with the bot, to initiate the telephone call. In some versions of those implementations, the user input to initiate the telephone call includes information points that are to be included in the synthesized speech that is provided for output at the corresponding computing device of the user.

In some implementations, a method implemented by one or more processors is provided, and includes determining that a first user and a second user are engaged in a telephone call. The first user being associated with a corresponding first computing device, and the second user being associated with a corresponding second computing device. The method further includes determining that the second user has placed the first user on hold, determining that the first user has hung up the corresponding first computing device, and, in response to determining that the first user has hung up the corresponding first phone and while the first user is on hold: maintaining the telephone call in an active state, and determining whether the second user has rejoined the telephone call. The method further includes, in response to determining that the second user has rejoined the telephone call: using a bot associated with the corresponding first computing device of the first user to continue the telephone call with the second user, providing, for output at the corresponding first computing device, a notification for the first user to rejoin the telephone call, determining that the first user has rejoined the telephone call, and, in response to determining that the first user has rejoined the telephone call, ceasing the telephone conversation between the second user and the bot.

These and other implementations of technology disclosed herein can optionally include one or more of the following features.

In some implementations, using the bot associated with the corresponding first computing device of the first user to continue the telephone call with the second user includes generating synthesized speech of the bot that indicates the first user is not an active participant on the telephone call, and providing, for output at the corresponding second computing device of the second user, the synthesized speech of the bot.

In some implementations, the method further includes prior to the first user rejoining the telephone call, receiving, from the second user, a user utterance, generating a transcription of the user utterance, and including the transcription of the user utterance in the notification for the first user to rejoin the telephone call.

In some implementations, maintaining the telephone call in the active state includes muting one or more microphones of the corresponding first computing device, and maintaining a telephonic connection between the corresponding first computing device and the corresponding second computing device.

In addition, some implementations include one or more processors (e.g., central processing unit(s) (CPU(s)), graphical processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer-readable storage media storing computer instructions executable by one or more processors to perform any of the aforementioned methods. Some implementations also include a computer program product including instructions executable by one or more processors to perform the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

The above description is provided as an overview of only some implementations disclosed herein. Those implementations, and other implementations, are described in additional detail herein.

BRIEF DESCRIPTION OF THE DRAWINGS

Like reference numbers and designations in the various drawings indicate like elements.

DETAILED DESCRIPTION

Figure 1:
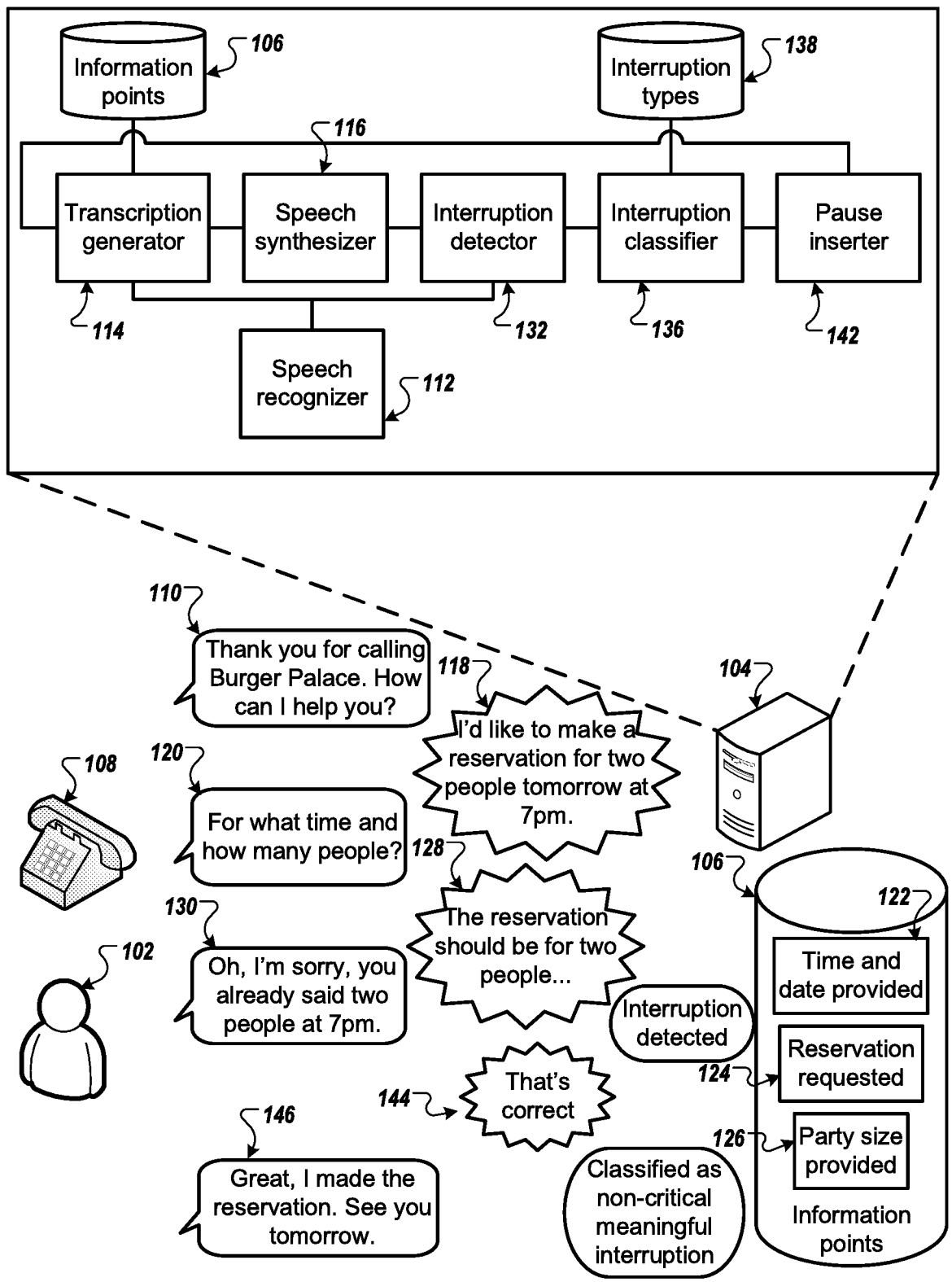
FIG. 1 illustrates an example system for handling interruptions received from a user while the user and a bot of a call initiating system are having a telephone conversation.

FIG. 1 illustrates an example system 100 for handling interruptions received from a human representative 102 while the representative 102 and a bot of the call initiating system 104 are having a telephone conversation. Briefly, and as described in more detail below, the call initiating system 104 is performing a task for a user by placing a telephone call (e.g., initiating an assisted call on behalf of the user). The representative 102 answers the telephone call and has a telephone conversation with the bot of the call initiating system 104 on behalf of the user. During the telephone call, the representative 102 may interrupt the bot (e.g., during the assisted call). The bot can identify the interruption, classify the interruption into one of multiple disparate interruption types, and continue the telephone conversation on behalf of the user based on the type of interruption.

As shown in FIG. 1, a user may interact with a digital assistant by requesting that the digital assistant make a reservation for Burger Palace the following day for two people at 7:00 pm. Burger Palace may be a small restaurant that does not have an online portal where the digital assistant can request the reservation. Instead, prospective patrons must call Burger Palace on the telephone to make a reservation. In this case, the digital assistant requests that the call initiating system 104 initiate a telephone call with the restaurant and make the reservation on behalf of the user. Although the system 100 shown in FIG. 1 is illustrated as being implemented by server(s) over network(s) (e.g., LAN, WAN, WiFi, Bluetooth, and/or other network(s)), it should be understood that is for the sake of example and is not meant to be limiting. For example, the system 100 can be implemented locally at a computing device of the user that initiated the assisted call and/or implemented by the computing device and the server(s) in a distributed manner over the network(s).

The digital assistant can provide the call initiating system 104 with data included in the request provided by the user. The information may include the requested date and time of the reservation (e.g., tomorrow at 7:00 pm), the requested business (e.g., Burger Palace), and number of people in the party (e.g., two). For requests other than restaurant reservations, the information may include the name of a requested service provider (e.g., an airline company, a utilities provider, and/or any other service provider), a description of the request for the service provider (e.g., making/modifying/discontinuing a service or reservation), and/or any other information that may be solicited by the representative 102 in performing the task on behalf of the user. The call initiating system 104 may store this data as information points 106. The information points 106 include, for example, information that the call initiating system 104 should provide to the representative 102 during the telephone call or that the call initiating system 104 should request that the representative 102 provide during the telephone call.

For example, assume the call initiating system 104 initiates a telephone call with Burger Palace, and assume the representative 102 answers the phone 108. Further assume, the representative 102 speaks the utterance 110 of "Thank you for calling Burger Palace. How can I help you?" The bot of the call initiating system 104 can detect the utterance 110, and provide the audio data of the utterance 110 to the speech recognizer 112. The speech recognizer 112 can generate a transcription of the utterance 110, and provide the transcription of the utterance 110 to the transcription generator 114.

The transcription generator 114 can generate a transcription that responsive to the utterance 110 of the representative 102. Further, the transcription generator 114 may access the information points 106 to determine whether providing information included in one of the information points 106 is an appropriate response to the utterance 110 of the representative 102. To determine whether the information included in one of the information points 106 is an appropriate response to the utterance 110 of the representative 102, the transcription generator 114 may use a variety of techniques, including a rules based approach and/or a machine learning based approach. In some implementations, the transcription generator 114 may identify keywords or phrases in the transcription of the utterance 110 of the representative 102. The transcription generator 114 may tokenize the transcription of the utterance 110 of the representative 102, and identify keywords among the tokenized terms. The transcription generator 114 may then use those keywords or phrases to determine the subject matter of the utterance 110 of the representative 102. The transcription generator 114 may use the subject matter of the utterance 110 of the representative 102 to generate a transcription of a response.

In some implementations, the transcription generator 114 uses a model trained using machine learning to determine subject matter of and/or an appropriate response to the utterance 110 of the representative 102. The call initiating system 104 may access training data that includes a log of previous conversations. The previous conversations may be specific to a type of business or organization, such as a restaurant business, an airline business, a government agency, and/or conversations specific to other businesses or organizations. Each of the utterances in the corresponding conversations may include keyword labels. The keyword labels can include the terms in the utterances, semantic representations of the terms in the utterances, and/or other types of labels for annotating utterances or transcriptions thereof. The call initiating system 104 can use the training data to train a machine learning model to identify keywords of an utterance when audio data that captures the utterance (and/or a transcription thereof) is applied as input across the machine learning model. In some additional and/or alternative implementations, the call initiating system 104 can use the training data to train the machine learning model to generate keywords for an appropriate response when audio data that captures the utterance (and/or a transcription thereof) is applied as input across the machine learning model.

The transcription generator 114 may use any combination of these machine learning models and/or a rule based approach to generate an appropriate response to the utterance 110 in combination with the information points 106. More particularly, the transcription generator 114 may use the machine learning models to generate the appropriate response, and use the information points 106 to fill in any details that may be unique to the current conversation. As shown in FIG. 1, the transcription generator 114 can analyze the transcription of the utterance 110 of the representative 102 to generate a response shell to which the transcription generator 114 applies one or more of the information points 106. For example, the transcription generator 114 may generate a response shell such as "I'd like to <blank>." The transcription generator 114 may fill in the blank with the information points 106 that include the requested task (e.g., make a reservation), the date and time (e.g., tomorrow at 7:00 PM), and the party size (e.g., two people). In this example, the transcription generator 114 can generate the transcription of "I'd like to make a reservation for two people tomorrow at 7 pm" responsive to processing the transcription of the utterance 110 of the representative 102.

The transcription generator 114 can provide the transcription generated by transcription generator 114 that is responsive to the utterance 110 of the representative 102 to the speech synthesizer 116. The speech synthesizer 116 can generate synthesized speech that includes audio data corresponding to the received transcription that is responsive to the utterance 110 of the representative 102. In some implementations, the speech synthesizer 116 may be configured to output synthesized speech in several different voices. For example, the speech synthesizer 116 may be configured to output synthesized speech (or a portion thereof during the conversation) in a voice similar to the user who requested the reservation, a reserved voice for the digital assistant, a voice of an operator who may take over for the bot if the transcription generator 114 is unable to generate an appropriate response, or another voice selected by the user who requested the reservation or selected by the call initiating system 104.

The call initiating system 104 can output the synthesized speech 118 of "I'd like to make a reservation for two people tomorrow at 7 pm" that was generated by the speech synthesizer 116 in response to receiving the utterance 110 of the representative 102. At this point, the transcription generator 114 may mark the information points 106 of date and time provided 122, reservation requested 124, and party size provided 126 as satisfied because the bot provided that information to the representative 102 as part of synthesized speech 118. Further assume in the example of FIG. 1 that the representative 102 hears the synthesized speech 118 through the telephone 108 and responds with the utterance 120. In response to detecting the utterance 120, the call initiating system 104 uses the speech recognizer 112 to generate a transcription of the utterance 120 of the representative 102 and the transcription generator 114 to generate a transcription of an appropriate response in the same or similar manner described above with respect to utterance 110.

In this instance, the transcription generator 114 determines that the representative 102 is requesting information that has already been provided. The transcription generator 114 may determine that the transcription of the utterance 120 includes keywords or phrases such as "what time" and "how many people." The transcription generator 114 may determine that these two phrases correspond to the information points 106 of date and time provided 122 and party size provided 126 that were included in the synthesized speech 118. Nonetheless, the transcription generator 114 can generate another transcription to provide these particular information points 106 to the representative 102 again. For example, the transcription generator 114 may generate the transcription of "The reservation should be for two people at 7 pm" response to receiving the utterance 120. Further, the transcription generator 114 can provide this transcription to the speech synthesizer 116.

The speech synthesizer 116 can generate synthesized speech 128 that includes audio data corresponding to the transcription that is generated responsive to the utterance 120. Moreover, the call initiating system 104 can output the synthesized speech 128 of "The reservation should be for two people at 7 pm" that was generated by the speech synthesizer 116 in response to receiving the utterance 120 of the representative 102. Further assume in the example of FIG. 1 that the representative 102 hears the synthesized speech 128 through the telephone 108, and, in the middle of outputting the synthesized speech 128, the representative 102 interrupts and speaks the utterance 130 of "Oh I'm sorry, you already said two people at 7 pm."

The interruption detector 132 may be continuously analyzing incoming audio data from the representative 102 and/or corresponding transcriptions thereof to determine whether an interruption has occurred. The interruption detector 132 can compare a signal strength of the incoming audio data to a threshold. If the signal strength of the incoming audio is above a certain threshold while the call initiating system 104 is outputting synthesized speech (e.g., above an ambient noise level), then the interruption detector 132 may determine that an interruption has occurred. In some implementations, the interruption detector 132 may analyze the transcription of the utterance 130 generated by the speech recognizer 112 and/or an energy level of the utterance 130. In this instance, if the speech recognizer 112 is able to generate a transcription of the utterance 130, then the call initiating system 104 may determine that the representative 102 or another person is speaking and that the telephone 108 is detecting that speech, and the interruption detector 132 may determine that there is an interruption. By using this technique, the interruption detector 132 may not identify an interruption if there is only background noise, somebody is speaking in the background, or the representative 102 is speaking in a lower volume, which likely indicates that the representative 102 is not speaking to the bot.

For example, assume the signal strength of the corresponding audio data for the utterance 130 is fifty-five decibels, and assume the threshold is forty decibels. In this example, the speech recognizer 112 can generate a transcription of the utterance 130 of the representative 102 based on the signal strength (e.g., fifty-five decibels) satisfying the threshold (e.g., forty decibels). Based on the speech recognizer 112 generating a transcription responsive to detecting the utterance 130 and/or the signal strength of the corresponding audio data for the utterance 130 satisfying the threshold, the interruption detector 132 can determine that the utterance 130 is an interruption utterance during the conversation (referred to hereinafter as "the interruption utterance 130").

The interruption classifier 136 can classify the interruption as a given type of interruption from multiple disparate interruption types 138. The interruption types 138 can be mutually exclusive, and can include, for example, a non-meaningful interruption, a non-critical meaningful interruption, a critical meaningful interruption, and/or other types of interruptions. A non-meaningful interruption may be an interruption that does not necessitate the call initiating system 104 to change the course of the conversation. For example, a given interruption detected by the interruption detector 132 can be classified as a non-meaningful interruption if it is determined that the detected interruption includes background noise, a whisper, background conversation, or the representative 102 confirming what the bot is saying by using words such as "right," "ok," uh-huh," or other similar affirmation/filler words and/or phrases. As another example, a given interruption detected by the interruption detector 132 can be classified as a non-meaningful interruption if it is determined that the representative 102 is repeating what the bot said. For instance, assume that the bot says "I'd like to make a reservation for two people tomorrow", and further assume, before the bot finishes and says, "at 7 pm," the representative 102 says "two people, tomorrow." In this instance, because the representative 102 repeated what the bot said, the interruption classifier 136 can classify the interruption as a non-meaningful interruption.

A non-critical meaningful interruption may be an interruption that necessitates the call initiating system 104 to change the course of the conversation, but does not necessitate that the bot immediately stop speaking. For example, a given interruption detected by the interruption detector 132 can be classified as a non-critical interruption if it is determined that the detected interruption includes a request for information points 106 that are yet to be provided. For instance, assume that the bot says "I'd like to make a reservation for two people tomorrow", and further assume, before the bot finishes and says, "at 7 pm," the representative 102 says "at what time?" In this instance, because the representative 102 is requesting information that is known to the bot (e.g., time and date provided 122), the interruption classifier 136 can classify the interruption as a non-critical interruption, and output synthesized speech of "7 PM" without pausing for the interruption. In some implementations, after detecting a non-critical meaningful interruption, the bot may reach a natural pause in the synthesized speech being before outputting all of the synthesized speech, and may cease outputting a remainder of the synthesized speech. For example, a given interruption detected by the interruption detector 132 can be classified as a non-meaningful interruption if it is determined that the detected interruption includes the representative 102 stating "excuse me," "please repeat," "slow down," and/or other words and/or phrases requesting that the bot clarifies or re-state preceding synthesized speech. For instance, assume that the bot says "I'd like to make a reservation for two people tomorrow", and further assume, before the bot finishes and says, "at 7 pm," the representative 102 says "pardon me." In this instance, because the representative 102 is requesting the bot to output the synthesized speech again, the interruption classifier 136 can classify the interruption as a non-critical interruption, and the bot can finish outputting the remainder of the synthesized speech before outputting the synthesized speech again.

A critical meaningful interruption may be an interruption that necessitates the call initiating system 104 to change the course of the conversation while necessitating that the bot immediately stop speaking. In some implementations, after a critical meaningful interruption is detected, the bot may finish the word that the bot is currently speaking and then cease outputting the remainder of the synthesized speech. For instance, assume that the bot says "I'd like to make a reservation for two people tomorrow", and further assume, before the bot finishes and says, "at 7 pm," the representative 102 says "please hold," "stop talking," "wait, wait, wait," and/or other similar words and/or phrases that indicate the bot should cease outputting of the synthesized speech. In this instance, because the representative 102 is requesting that the bot cease providing of the synthesized speech, the interruption classifier 136 can classify the interruption as a critical meaning interruption. Accordingly, after the representative 102 has finished speaking the interrupting utterance, the bot may respond to the interrupting utterance with the appropriate action (e.g., ending the conversation, cease outputting of synthesized speech, repeating most recently output synthesized speech, and/or other actions responsive to the detected interruption).

The interruption classifier 136 may classify the detected interruption using various classification techniques. In some implementations, the interruption classifier 136 can process the interrupting utterance of the representative 102 using one or more machine learning models to classify the interrupting utterance of the representative 102 as one of the interruption types 136. The call initiating system 104 may can train the one or more machine learning models using training instances. Each of the training instances can include training instance input and corresponding training instance output. The training instance input can include audio data capturing interrupting utterances (and/or transcriptions thereof), and the corresponding training instance output can include ground truth labels that correspond to a classification of the interrupting utterance (e.g., non-meaningful interruption, a non-critical meaningful interruption, a critical meaningful interruption, and/or other types of interruptions). For example, a first training instance input can include audio data capturing an utterance of "wait, I can't hear you" (and/or a transcription thereof), and first training instance output can include a ground truth label corresponding to a critical meaningful interruption. Further, a second training instance input can audio data capturing an utterance of "tomorrow at" (and/or a transcription thereof), and first training instance output can include a ground truth label corresponding to a non-meaningful interruption. In some implementations, the training instance input may further include audio data capturing synthesized speech (and/or a transcription thereof) of the synthesized speech that was being output when the interrupting utterance was detected.

In some additional and/or alternative implementations, the interruption classifier 136 can process the interrupting utterance of the representative 102 using one or more rules to classify the interrupting utterance of the representative 102 as one of the interruption types 136. In some versions of those implementations, the interruption classifier 136 may tokenize the interrupting utterance, and compare the tokens to various groups of terms. If the tokens include terms of a first group, then the interruption classifier 136 may classify the interruption as a critical meaningful interruption. Further, if the tokens include terms from a second group that are distinct from the terms included in the first group, then the interruption classifier 136 may classify the interruption as a non-critical meaningful interruption. Even further, if the tokens include terms from a third group that are distinct from the terms of both the first group and the second group, then the interruption classifier 136 may classify the interruption as a non-meaningful interruption. By using this tiered approach for classifying the interruptions, the interruption classifier 136 may err on the side of over classifying interruptions because additional pauses in the conversation caused by classifying a given interruption as a non-critical meaningful interruption rather than a non-meaningful interruption allows both the call initiating system 104 and the representative to process exchanged subject matter of the conversation, thereby concluding the conversation in a quick and efficient manner. In various implementations, the interruption classifier 136 may not use a third group of terms because the interruption classifier 136 may classify the interruption as a non-meaningful interruption if the terms of the interruption are not included in either the first or second group of terms. Moreover, in various implementations, the interruption classifier 136 may determine that there is no interruption if no terms of the interruption are in the first, second, or third group of terms.

In some versions of those implementations, the terms in each of the groups that the interruption classifier 136 compares the tokens to may be fixed, while in other versions of those implementations, the tokens may change depending on the telephone conversation. For example, the first group of terms may include "stop talking" and "can't hear," whereas the second group of terms may include "excuse me," "I'm sorry," and/or terms that are semantically similar to those included in the synthesized speech. The terms that are semantically similar to those included in the synthesized speech may include terms that are semantically similar to the information points 106. For example, the information points 106 depicted in FIG. 1 can include information provided the user, such as "two people," "7 pm," and "tomorrow." In this example, the semantically similar terms for the second group may include "three people (as opposed to "two people"), "8 pm" (as opposed to "7 pm"), and "next week" (as opposed to "tomorrow"). In this manner, if the terms of the interruption include any semantically similar terms that suggest the representative 102 misunderstood the bot, then the interruption classifier 136 may classify the interruption as a non-critical meaningful interruption. The third group of terms may include terms such as "right," "uh huh," and/or other filler/affirmation terms that conform with the representative 102 understanding information included in the information points 106 (e.g., "two people," "7 pm," and "tomorrow").

Moreover, in the example shown in FIG. 1, the representative 102 may begin to speak the interruption utterance 130 after the bot says "for two" of the synthesized speech 128. The interruption detector 132 may detect an interruption based on the speech recognizer 112 recognizing speech in the interruption utterance 130, and/or based on the energy level of the audio data corresponding to the interruption utterance 130 being above a threshold as discussed above. The interruption classifier 136 may apply an initial portion of the transcription of the interruption utterance 130 and/or the synthesized speech 128 of the bot as input across a trained machine learning model and/or rules based model. The initial portion may include "oh, I'm sorry," of the interruption utterance 130. In implementations where the interruption classifier 136 utilizes a machine learning model, the interruption classifier 136 may classify the interruption included in the interruption utterance 130 is a non-critical meaningful interruption based on processing the audio data corresponding to the interruption utterance 130 (and optionally the synthesized speech 128 that immediately preceded the interruption utterance 130). In implementations where the interruption classifier 136 includes one or more rules, the interruption classifier 136 may tokenize the initial portion of the interruption utterance 130, and the tokens may include the terms "oh" and "I'm sorry." Further, the interruption classifier 136 may continue to tokenize the interruption utterance 130 as the speech recognizer transcribes additional words. Although the terms "oh" and "I'm sorry" may not match any terms in the first group the term "I'm sorry" may match a term in the second group. In this case, the interruption classifier 136 may classify the interruption depicted in FIG. 1 as a non-critical meaningful interruption.

With the interruption classified, the pause inserter 142 can identify whether and/or when the bot should cease outputting synthesized speech. For example, if the interruption is a non-meaningful interruption, then the pause inserter 142 may determine that there is no need to insert a pause in the synthesized speech of the bot, and determine that the bot may continue outputting synthesized speech as if the interruption did not occur. As another example, if the interruption is a critical meaningful interruption, then the pause inserter 142 may determine that a pause needs to be inserted in the synthesized speech when the bot completes outputting of a current word and/or phrase. In this example, the pause inserter 142 can provide an indication to the transcription generator 114 to cease providing terms and/or words to the speech synthesizer 116 to be output to the representative 102. Further, the transcription generator 114 need not provide an additional transcription to the speech synthesizer 116 until the representative 102 completes speaking of the interruption utterance 130.

Upon receiving a pause instruction from the pause inserter 142, the transcription generator 114 may update the information points 106 to indicate whether or not they have been provided to the representative. For instance, the transcription generator 114 may update a given information point of the information points 106 as satisfied after outputting of synthesized speech that includes the given information point. In the example of FIG. 1, the transcription generator 114 may update the information points for the time and date provided 122, the reservation requested 124, and the party size provided 126 to indicate that they are satisfied because the bot has already output synthesized speech that includes those information points 106. Notably, although those information points 106 are updated to indicate that they are satisfied, the bot may still repeat those information points 106 if requested by the representative 102 and/or if there is a misunderstanding by the representative 102, but those information points 106 may not be voluntarily provided by the bot twice.

As noted above, in the example of FIG. 1 the interruption classifier 136 classifies the interruption as a non-critical meaningful interruption. In this example, the pause identifier 142 may determine a position in the synthesized speech 128 for a natural pause (i.e., a pause in the synthesized speech being output when the interruption utterance 130 is detected). The natural pause may be at the end of a sentence, at the end of a prepositional phrase, before a prepositional phrase, before a conjunction, and/or any other similar part of speech where a speaker may naturally pause. The pause identifier 142 may identify a natural pause location after the preposition phrase "for two people" in synthesized speech 128 (i.e., before providing the portion of "at 7 pm" responsive to the utterance 120). Further, the pause inserter 142 may instruct the transcription generator 114 to cease providing a transcription of a response to the utterance 120 to the speech synthesizer 116.

Moreover, as shown in FIG. 1, the bot may cease outputting synthesized speech 128 after outputting "for two people", and the representative 102 may continue speaking the interruption utterance 130. The speech recognizer 112 can transcribe the remaining portion of the interruption utterance 130, and the transcription generator 114 can receive the transcription of the interruption utterance 130 of "Oh, I'm sorry, you already said two people at 7 pm." Further, the transcription generator 114 can generate a response to the interruption utterance 130 by generating the transcription "that's correct," and the speech synthesizer 116 can generates the synthesized speech 144 of "That's correct." The call initiating system 104 can then transmit the synthesized speech 144 to the telephone 108 of the representative.

After the call initiating system 104 transmits the synthesized speech 144 to the telephone 108 of the representative 102, the call initiating system 104 may determine that the interruption is complete. At this point, the transcription generator 114 can determine whether all of the information points 106 are satisfied. If they are, then the transcription generator 114 can generate further transcriptions to complete the telephone call. If there are information points 106 that still remain incomplete after the interruption, then the transcription generator 114 can generate transcriptions that provide the information of the incomplete information points to the representative 102, the speech synthesizer 116 can generate synthesized speech corresponding to the transcriptions, and the synthesized speech can be output at the telephone 108 of the representative 102.

In the example of FIG. 1, the representative 102 responds to the synthesized speech 144 by speaking the utterance 146 of "Great, I made the reservation. See you tomorrow." The speech recognizer can perform speech recognition on the utterance 146, the speech recognizer 112 can provide the transcription of the utterance 146 to the transcription generator 114, and the transcription generator 114 can determine that that the information points 106 are satisfied. In response to determining that all of the information points 106 are satisfied and/or in response to determining that the representative is ending the telephone call (e.g., based on recognized text included in the utterance 146), the transcription generator 114 can generate a transcription to end the telephone call. The transcription generator 114 can provide the transcription to the speech synthesizer 116. The call initiating system 104 transmits the synthesized utterance to the telephone 108 and terminates the telephone call (e.g., "Thank you, see you tomorrow").

In some implementations, the transcription generator 114 may steer the telephone conversation back to the subject of synthesized speech 128 before the interruption utterance 130 was detected. In this case, the transcription generator 114 may generate a transcription that completes any incomplete information points 106 (e.g., "7 pm") of synthesized speech 128 and generate further synthesized speech based on the unsatisfied information points 106. The transcription generator 114 can provide the transcription to the speech synthesizer 116. The call initiating system 104 transmits the synthesized speech to the telephone 108. For example, if the interruption utterance 130 only indicated "you already said two people", but did not acknowledge the prior synthesized speech 118 that included "7 pm", then the synthesized speech 144 may also include synthesized speech that includes the time and date provided 122 (e.g., "That's correct, and 7 pm").

In various implementations of the call initiating system 104, the bot can cause synthesized speech that requests the representative 102 to consent to having the conversation with the bot on behalf of the user to be output at the telephone 108 of the representative 102. In some implementations, the bot can cause the synthesized speech to be output when the representative 102 answers the assisted call. For example, in response to detecting the utterance 110 of the representative 102, the bot can cause synthesized speech of "Hello, this is bot calling on behalf of John Doe, do you consent to monitoring of this call". If the bot receives consent from the representative 102, then the bot can then output the synthesized speech 118. However, if the bot does not receive consent from the representative 102, then the bot can terminate the assisted call, and can notify the user that the representative 102 did not consent to the assisted call.

Figure 2:
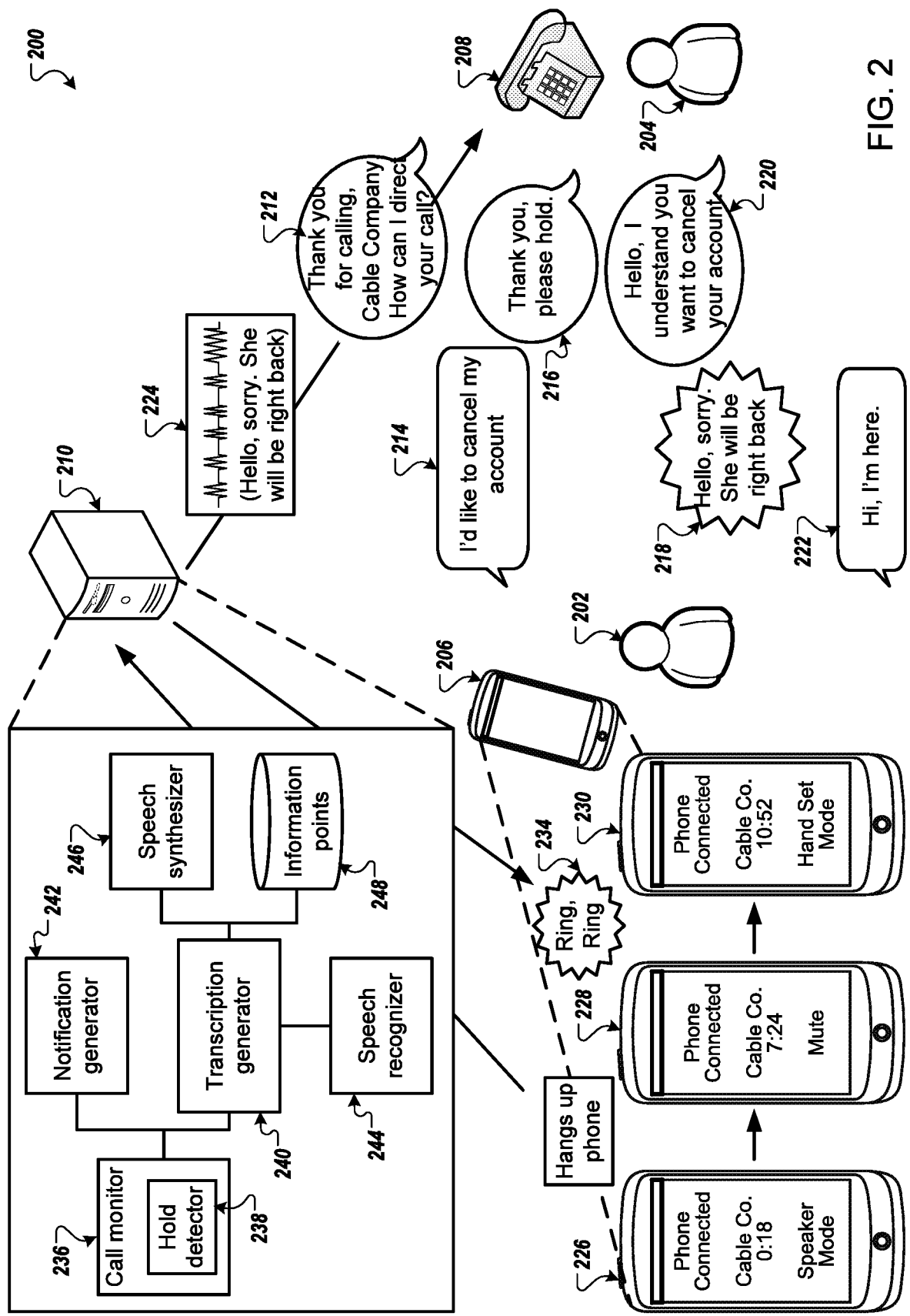
FIG. 2 illustrates an example system that monitors a telephone call where one user is on hold and that notifies the user on hold when the other user has rejoined the telephone call.

FIG. 2 illustrates an example system 200 that monitors a telephone call between a first user 202 a second user 204. For example, the first user 202 of the telephone call may be on hold, and the system 200 can notify the first user 202 that is on hold when the second user 204 has rejoined the telephone call. Briefly, and as described in more detail below, the first user 202 may call the second user 204, and the second user 204 may place the first user 202 on hold. The first user 202 may hang up the phone 206 in response to being placed on hold. The call monitoring system 210 can monitor the telephone call to detect that the first user 202 hangs up the phone 206 while on hold. Although the first user 202 hangs up the phone 206, the call monitoring system 210 can maintain the telephone call in an active state in response to the first user 206 hanging up the phone 206, and can notify the first user 202 when the second user 204 rejoins the telephone call. Moreover, although the system 200 shown in FIG. 2 is illustrated as being implemented by server(s) over network(s) (e.g., LAN, WAN, Bluetooth, and/or other network(s)), it should be understood that is for the sake of example and is not meant to be limiting. For example, the system 200 can be implemented locally at a computing device of the first user 202 and/or implemented by the computing device of the first user 202 and the server(s) in a distributed manner over the network(s).

The first user 202 can configure the call settings on the phone 206 to enable the call monitoring system 210 to monitor telephone calls of the user 202. As shown in FIG. 2, assume the first user 202 places a telephone call to the second user 204 using a corresponding computing device (e.g., phone 206), and that the call monitoring system 210 is enabled. In this example, the call monitoring system 210 can monitor the telephone call between the first user 202 and the second user 204. During the initial portion of the telephone call, the phone 206 may be in a first state 226 where the phone 206 is connected to telephone 208. Further assume that the second user 204 answers the telephone call using telephone 208 and speaks the utterance 212 of "Thank you for calling Cable Company. How may I direct your call," assume that the first user 202 responds to the second user 204 with the utterance 214 of "I'd like to cancel my account," and assume that the second user 204 responds to the first user 202 with the utterance 216 of "Thank you, please hold."

During this exchange between the first user 202 and the second user 204, the call monitoring system 210 can monitor the telephone call, and can use the speech recognizer 244 to perform speech recognition on the utterances 212, 214, and 216 of both the first user 202 and the second user 204. The call monitoring system 210 can analyze corresponding transcriptions of the utterances 212, 214, and 216 to determine the subject matter of the telephone call. Further, the call monitoring system 210 can store the subject matter of the telephone call and/or other details of the telephone call in the information points 248. In this example, the call monitoring system 210 can store the information point of "cancel account for cable company," and can label this information point as initially unsatisfied since the call was placed on hold prior to the first user 202 receiving confirmation from the second user 204 that the cable account was cancelled.

The call monitor 236 of the call monitoring system 210 can include a hold detector 238. The hold detector 238 can determine that the second user 204 has placed the first user 202 on hold. The hold detector 238 can determine that the second user 204 has placed the first user 202 on hold based on, for example, detecting an utterance from the second user 204 that explicitly states the first user 202 is being placed on hold (e.g., "please hold" in the utterance 216), detecting a threshold duration of silence (e.g., no utterances of the first user 202 or the second user 204 are detected for 30 seconds, 45 seconds, and/or other durations of time), detecting that another bot has taken over the call on behalf of the second user (e.g., based on signal energy, voice identification, and so on), detecting metadata associated with the call that indicates the first user 202 has been placed on hold, and/or based on other techniques for determining that a call has been placed on hold. At this point, the call monitoring system 210 can maintain the call in an active state even if the user attempts to hang up.

As shown in FIG. 2, the first user 202 attempts to hang up the phone 206 while the phone 206 is in the first state 226 because the first user 202 does not want to wait on hold. Notably, even though the first user 202 hangs up the phone 206, the call monitoring system 210 can prevent the call from disconnecting entirely. Rather, the call monitoring system 210 can cause the phone 206 to transition from the first state 226 (e.g., connected) to the second state 228 (e.g., mute). In the second state 228, the call between the first user 202 and the second user 204 is still active, but microphone(s) of the phone 206 are muted. The phone 206 may indicate that there is a telephone call active in the background, and also indicate that the microphone(s) are muted. The first user 202 may be able to use the phone 206 to perform other activities while the call monitoring system 210 maintains the telephone call in the second state 228. In some implementations, the first user 202 can provide additional input (e.g., spoken, touch, and/or typed) while the phone is in the first state 226 or the second state 228 that causes the call monitoring system 210 to disconnect the call entirely.

In some implementations, the call monitoring system 210 may not require that the first user 202 attempt to hang up the phone 206 to cause the phone 206 to transition from the first state 226 (e.g., connected) to the second state 228 (e.g., mute). Rather, the hold detector 238 can determine that the second user 204 has placed the first user 202 on hold, and, in response, the call monitor 236 can automatically cause the phone 206 to transition from the first state 226 (e.g., connected) to the second state 228 (e.g., mute), thereby maintaining the telephone call in the active state. The active state can be, for example, the phone 206 of the first user 202 maintaining the connection with the phone 208 of the second user 204 over network(s) (Voice over Internet Protocol (VoIP), public switched telephone network (PSTN), and/or other telephonic communication protocols).

As shown in FIG. 2, assume that the second user 204 rejoins the telephone call. At this point, the hold detector 238 determines that the first user 202 is no longer on hold, and the hold detector 238 can provide an indication to the notification generator 242 that the first user 202 is no longer on hold. In this example, the notification generator 242 causes the phone 206 to output an audible notification 234 (in addition to or in lieu of a visual notification) for the first user 202 that indicates the first user 228 is no longer on hold (e.g., the phone 206 vibrates/rings like an incoming call, the phone 206 vibrates/dings like an incoming notification, the phone 206 causes a visual notification to be rendered on a display of the phone 206, and so on). In some additional and/or alternative implementations, the notification generator 242 may determine that the first user 202 is using the phone 206. In this case, the notification generator 242 can present a visual notification on the display of the phone 206 (in addition to or in lieu of an audible notification).

When the second user 204 rejoins the telephone call, assume that the second user 204 speaks the utterance 220 of "Hello, I understand you want to cancel your account." In some implementations, and as shown in FIG. 2, the first user 202 may not have rejoined the call yet responsive to receiving the notification 234. In this case, a bot of the call monitoring system 210 may generate synthesized speech 218 of "Hello, sorry. She will be right back" to output to the phone 208 of the second user 204 while waiting for the first user 202 to rejoin the telephone call. The call monitoring system 210 can generate the synthesized speech in a similar manner described in more detail above with respect to FIG. 1. For example, the speech recognizer 244 can perform speech recognition on the utterance 220 of the second user 204 using the speech recognizer 244, the transcription generator 240 can generate a transcription that is responsive to the utterance 220, the speech synthesizer 246 can generate synthesized speech that includes audio data corresponding to the transcription that is responsive to the utterance, and the call monitoring system can cause the synthesized speech to be output at the phone 208 of the second user. In some versions of those implementations, the call monitoring system 210 can cause the transcription of the utterance 220 of the second user 204 to be visually rendered and/or cause audio data that captures the utterance 220 of the second user 204 to be audibly rendered at the phone 206 of the first user.

In some implementations, the transcription that is responsive to the to the utterance 220 of the second user 204 can indicate that the notification 234 was output to first user 202 and/or indicate that the first user 202 will return to the telephone call shortly. As noted above, the transcription generator 240 can generate the transcription of "Hello, sorry. She will be right back" and provide the transcription to the speech synthesizer 246, and the speech synthesizer 246 can generate synthesized speech that includes audio data 224 corresponding to the synthesized speech 218. The call monitoring system 210 can transmit the audio data 224 directly to the telephone 208, or to the phone 206 for transmission to the telephone 208.

In some implementations, the transcription generator 240 may use the transcription of the utterance 220 of the second user 204, and the information points 248 of the telephone call to generate the transcription that is provided to the speech synthesizer 246. In this instance, the transcription generator 240 may access the information points 248 that include details related to cancelling an account with Cable Company. As another example, the transcription generator 240 can generate the transcription, "Hello, sorry, she is looking for her account information and will be right back" and provide the transcription to the speech synthesizer 246, and the speech synthesizer 246 can generate synthesized speech that includes audio data corresponding to the synthesized speech. Again, the call monitoring system 210 can transmit the audio data to the telephone 208, or to the phone 206 for transmission to the telephone 208.

In some implementations, the call monitoring system 210 can continue the conversation with the second user 204 on behalf of the first user until the first user 202 rejoins the call. The transcription generator 240 may use a technique similar to the one described in FIG. 1 for generating transcriptions that are relevant to additional information points and/or additional utterances of the second user 204 that are detected at the phone 206. In this case, the transcription generator 240 may generate transcriptions indicating that the first user 202 is not ready to continue the conversation with second user 204. For example, the transcription generator 240 may generate the transcription, "Hello, sorry. I'm still looking for my account information" or "Hello. Please give me a moment while my computer boots up." In some versions of those implementations, the bot can access a user profile of the first user 202 and provide information that is included in the user profile (e.g., an address of the first user 202, a name of the first user 202, an account number of the first user 202 that is associated with the cable company, and so on).

In some additional and/or alternative implementations, the bot may place the second user 204 on hold and/or terminate the telephone call if the first user does not rejoin the call within a threshold duration of time. The threshold duration of time may be fixed or dynamic. In implementations where the threshold duration of time is dynamic, the threshold duration of time may be based on interactions of the first user 202 with the phone 206. For example, if the first user 202 does not interact with the notification 234 for 30 seconds, then the bot may place the second user 204 on hold. In this example, if the first user 202 does not rejoin the call within 60 seconds of the second user 204 being placed on hold, then the bot may determine that the call should be terminated. As another example, if the first user 202 interacts with the notification 234 but has not yet rejoined the call, then the bot may place the second user 204 on hold after 60 seconds. In this example, if the first user 202 does not rejoin the call within an additional 60 seconds of the second user 204 being placed on hold, then the bot may determine that the call should be terminated.

As shown in FIG. 2, assume that the first user 202 rejoins the telephone call responsive to receiving the notification 234 and speaks the utterance 222 of "Hi, I'm here." When the first user 202 rejoins the call, the phone 206 can transition from the second state 228 (e.g., "mute") to the third state 230 (e.g., "connected" or "re-connected") where the phone 206 remains connected to the telephone call and the microphone(s) of the phone 206 of the first user 202 are un-muted. The call monitoring system 210 and the call monitor 236 can return to monitoring the telephone call.

In some additional and/or alternative implementations, and although not depicted in FIG. 2, the call monitoring system 210 can determine that the first user 202 rejoined the call responsive to receiving the notification 234 before (or during) detection of the utterance 220 of the second user 204. The call monitoring system 210 can determine that the first user 202 rejoined the call before (or during) detection of the utterance 220 of the second user 202 based on, for example, determining that the phone 206 transitioned from the second state 228 to the third state 230, determining that a spoken utterance detected at the phone 206 corresponds to the first user 202 using voice identification (and optionally determining that the spoken utterance is responsive to the utterance 220 of the second user 204), and/or using other techniques to determine that the first user 202 has rejoined the call. In some versions of those implementations, the call monitoring system 210 can determine that there is no need for the bot to generate the synthesized speech 218 and/or to engage in conversation with the second user 204. For example, assume that the first user 202 rejoins the phone call immediately upon receiving the notification 234 and while the second user 204 is speaking the utterance 220. In this example, the call monitoring system 210 may not invoke the bot to engage in conversation with the second user 204 since the first user 202 has already rejoined the call. In some further versions of those implementations, the call monitoring system 210 may still cause a transcription of the utterance 220 of the second user 204 to be visually rendered on the phone 206 of the first user 202 to ensure the first user 202 is aware of the entirety of the utterance 220 of the second user 204.

In various implementations of the call monitoring system 210, the bot can cause synthesized speech that requests the second user 204 to consent to having the conversation between the first user 202 and the second user 204 monitored by the bot. In some implementations, the bot can cause the synthesized speech to be output when the second user 204 answers the call. For example, in response to detecting the utterance 212 of the of the second user, the bot can cause synthesized speech of "Hello, do you consent to the bot joining this call" to be rendered. If the bot receives consent from the second user 204, then the bot can join the conversation. However, if the bot does not receive consent from the second user 204, then the bot may not join the call. Even if the bot does not receive consent from the second user 204 to join the call, the bot may still monitor the call. For example, the bot may still monitor the call to determine whether and/or the second user 204 rejoins the call using a voice activity detector (VAD) trained to detect voice activity, a hotword detector trained to detect particular words and/or phrases (e.g., "Hello," "I'm sorry for wait,", and so on). However, the bot may not use speech recognizer 244 to process any utterances of the second user 204.

Figure 3A:
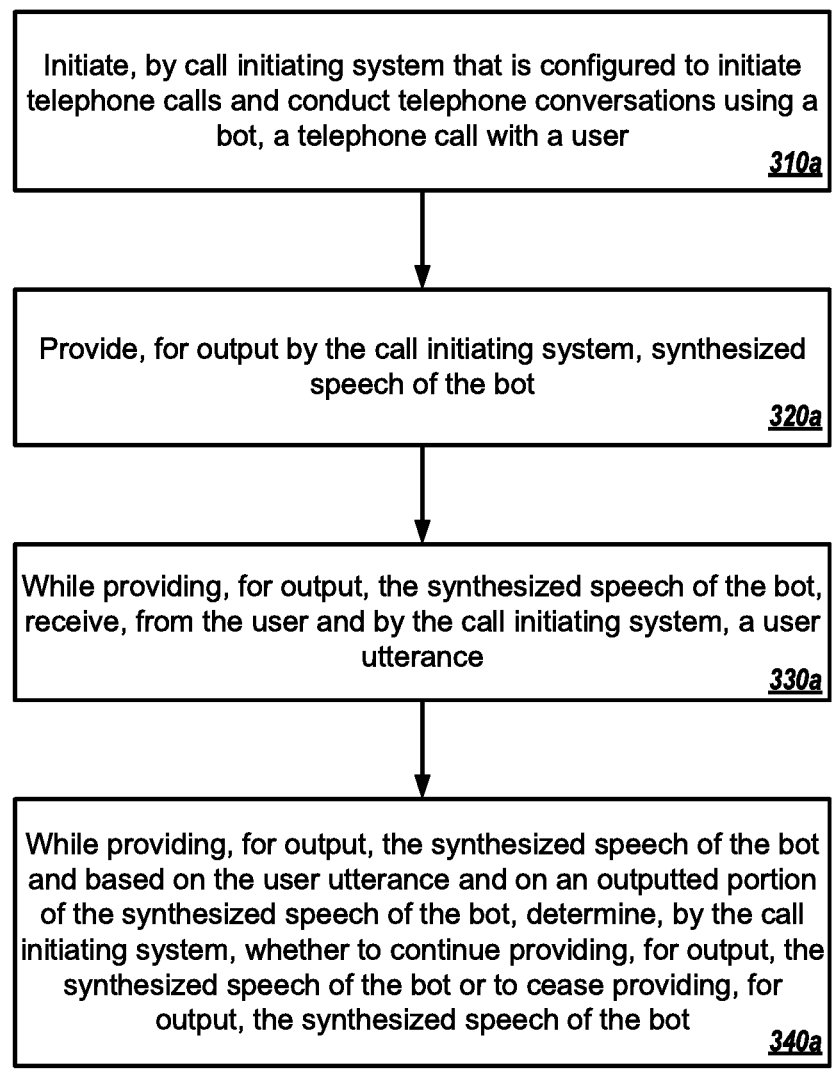
FIG. 3A is a flowchart of an example process for handling interruptions received from a user while the user and a bot of a call initiating system are having a telephone conversation

FIG. 3A is a flowchart of an example process 300a for handling interruptions received from a user (or representative) while the user and a bot of a call initiating system are engaged in a telephone conversation (e.g., as described in more detail above with respect to FIG. 1). In general, the process 300a can initiate a telephone conversation with the user (or representative) using a bot associated with a corresponding user of a computing device. During the telephone conversation, the user (or representative) may interrupt the bot while the bot is outputting synthesized speech. The bot can identify and classify the interruption to determine the appropriate way to handle the interruption. After handling the interruption, the bot can steer the conversation back to the subject matter discussed before the interruption or proceed with the conversation. For the sake of simplicity, operations of the process 300a will be described as being performed by a system that includes one or more processors (e.g., the system 100 of FIG. 1). The system can be implemented, for example, by server(s), a computing device of a corresponding user associated with the bot, and/or a combination thereof.

At block 310a, the system initiates, by a call initiating system that is configured to initiate telephone calls and conduct telephone conversations using a bot, a telephone call with a user. The system can initiate the call in response to detecting user input (e.g., spoken, typed, and/or touch) at a corresponding computing device of a given user that requests the call be initiated on behalf of the given user. The bot can engage in the conversation with the user on behalf of the given user of the corresponding computing device. In some implementations, the bot can solicit information from the given user prior initiating the telephone call with the user. For example, if the given user provides user input of "Make a reservation at Burger Palace," then the bot can solicit time and date information and party size information from the given user that requested the bot make the reservation. The user can be another bot or a human representative associated with a business or agency that is engaged with during the conversation. Continuing with the above example, the user can be another bot or human employee associated with Burger Palace. Initiating the call with the user is described in more detail herein (e.g., with respect to FIG. 1).

At block 320a, the system provides, for output by the call initiating system, synthesized speech of the bot. The synthesized speech can include audio data corresponding to, for example, a request that the user consent to engaging with the bot during the conversation upon initiating of the call, information related to a task to be performed on behalf of a given user that provided user input to initiate the call, and/or other synthesized speech to facilitate the conversation between the bot and user. The synthesized speech can be output via speaker(s) of a computing device associated with the user such that the synthesized speech can be audibly perceived by the user. Providing the synthesized speech is described in more detail herein (e.g., with respect to FIG. 1).

At block 330a, while providing, for output, the synthesized speech of the bot, the system receives, from the user and by the call initiating system, a user utterance. The system can continuously monitor for utterances of the user even while the bot is outputting the synthesized speech. Put another way, the system can detect an utterance of the user while the bot is outputting the synthesized speech at the computing device associated with the user. Receiving the user utterance while the bot is outputting the synthesized speech is described in more detail herein (e.g., with respect to FIG. 1).

At block 340a, while providing, for output, the synthesized speech of the bot and based on the user utterance and on an outputted portion of the synthesized speech of the bot, the system determines whether to continue providing, for output, the synthesized speech of the bot or to cease providing, for output, the synthesized speech of the bot. The system can classify the user utterance received at block 330a into one of a plurality of disparate types of interruptions (e.g., a non-meaningful interruption, a non-critical meaningful interruption, a critical meaningful interruption, and/or other types of interruptions). Further, the system can determine whether to continue or cease providing of the synthesized speech based on the classifying of the user utterance. The system can classify the user utterance into one of the plurality of disparate types of interruptions based on processing, using machine learning model(s) and/or one or more rules, the user utterance received at block 330a (and optionally the synthesized speech). Moreover, the system can cause the bot to steer the conversation back to subject matter included in the synthesized speech prior to receiving the user utterance at block 330a, continue the conversation as if the user utterance was not received at block 330a, and/or change direction of the conversation to cause further synthesized speech that is responsive to the user utterance received at block 330a. Classifying the user utterance into one of the plurality of disparate interruptions types, and determining whether or not to cease providing of the synthesized speech is described in more detail herein (e.g., with respect to FIG. 1).

Figure 3B:
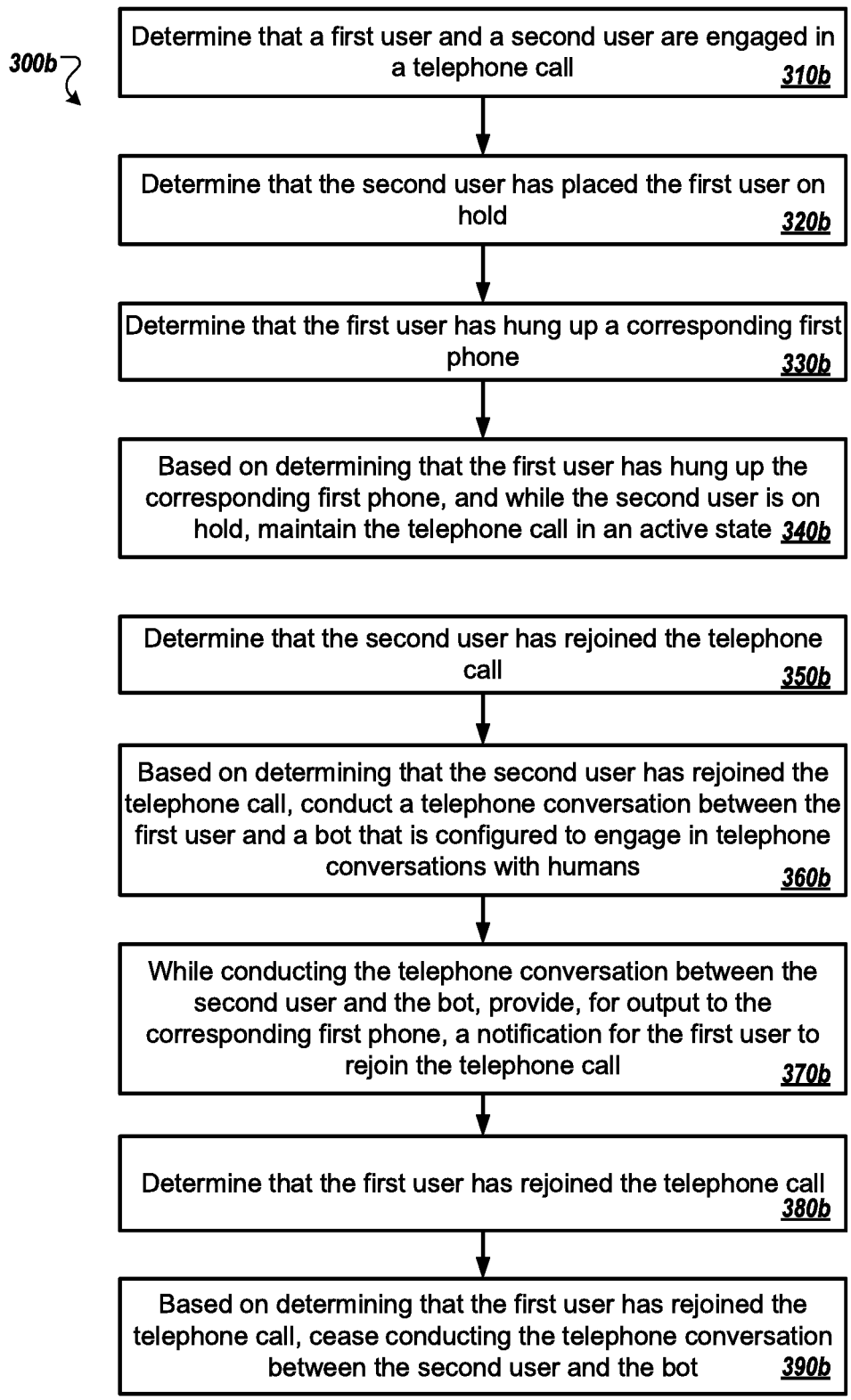
FIG. 3B is a flowchart of an example process for monitoring a telephone call where one user is on hold and for notifying the user on hold when the other user has rejoined the call.

FIG. 3B is a flowchart of an example process for monitoring a telephone call where one user is on hold and for notifying the user on hold when the other user has rejoined the call. In general, the process 300b monitors a telephone conversation between two users. One of the users places the other user on hold. Instead of waiting, the user on hold attempts to hang up the phone. The process 300b maintain the phone call in an active state and notifies the user on hold when the other user has rejoined the call. The process 300b may use a bot to conduct a conversation with the user who has rejoined while waiting for the user who was on hold to return to the call. For the sake of simplicity, operations of the process 300b will be described as being performed by a system that includes one or more processors (e.g., the system 200 of FIG. 2). The system can be implemented, for example, by server(s), a computing device of a corresponding user associated with the bot, and/or a combination thereof.

At block 310b, the system determines that a first user and a second user are engaged in a telephone call. The system can determine that the first user and the second user are engaged in the telephone call based on a state of a corresponding first phone associated with the first user. The state of the corresponding first phone can indicate, for example, that the first user and the second user are connected using a telephonic communication protocol (e.g., VoIP, PSTN, and/or other protocols). Determining that the first user and the second user are engaged in a telephone call is described in more detail herein (e.g., with respect to FIG. 2).

At block 320b, the system determines that the second user has placed the first user on hold. The system can determine that the second user has placed the first user on hold based on processing user utterances of the conversation. For example, the system can process a stream of audio data corresponding to the user utterances of the conversation. Based on processing the stream of audio data (e.g., using a speech recognizer), the system can determine that recognized text corresponding to the stream of audio data indicates that the second user placed the first user on hold. For example, the system can process the user utterances of the conversation to determine that the second user stated "Please hold," "Will you please hold while I transfer your call," and/or other phrases that indicate the second user placed the first user on hold. Determining that the second user has placed the first user on hold is described in more detail herein (e.g., with respect to FIG. 2).

At block 330b, the system determines that the first user has hung up a corresponding first phone. The system can determine that the first user has hung up the corresponding first phone based on determining that the first user provided user input at the corresponding first to terminate the phone call. For example, the system can determine that the first user has hung up the corresponding first input based on user input directed to a button (e.g., physical button and/or soft button on a graphical user interface) that, when selected, causes the telephone call to be terminated, based on the first user placing the corresponding first phone in a locked state, and/or based on other interactions with the corresponding first phone. Determining that the first user has hung up a corresponding first phone is described in more detail herein (e.g., with respect to FIG. 2).

At block 340b, based on determining that the first user has hung up the corresponding first phone, and while the first user is on hold, the system maintains the telephone call in an active state. The system can maintain the active state of the telephone call by causing the corresponding first phone to transition from a first state to a second state. In the second state, microphone(s) of the corresponding first computing device can be muted, and the first user can interact with the corresponding first phone while the system maintains the telephonic connection with a corresponding second phone of the second user in the background. Maintaining the corresponding first phone in the active state is described in more detail herein (e.g., with respect to FIG. 2).

At block 350b, the system determines that the second user has rejoined the telephone call. The system can determine that the second user has rejoined the call. In some implementations, the system can determine that the second user has rejoined the call based on detecting a further user utterance of the second user. The system can use a voice activity detector, speech recognizer, and/or other components to determine that the second user has rejoined the call. In some versions of those implementations, the system can determine that the user utterance originated from the second user (i.e., as opposed to audio data corresponding music being played while, audio data corresponding to that of an interactive voice response (IVR) system, and so on) using voice identification. Determining that the second user has rejoined the telephone call is described in more detail herein (e.g., with respect to FIG. 2). Notably, there is a break between block 340b and block 350b. This break indicates that the system can maintain the active state of the telephone call at block 340*b* while actively monitoring for the second user to rejoin the telephone call at block 350*b*.

At block 360*b*, based on determining that the second user has rejoined the telephone call, the system conducts a telephone conversation between the second user and a bot that is configured to conduct telephone conversations with humans. The system can cause the bot to output synthesized speech in response to determining that the second user has provided a user utterance upon rejoining the telephone call. In some implementations, the system only causes the bot to output the synthesized speech in response to determining that the first user has not yet rejoined the telephone call. The synthesized speech can indicate that bot is an active participant in the conversation, and on behalf of the first user. In some additional and/or alternative implementations, the bot can output synthesized speech that includes information points that are to be conveyed to the second user during the telephone call (e.g., name information, address information, account information, and/or other information associated with the first user). Conducting the telephone conversation between the bot and the second user is described in more detail herein (e.g., with respect to FIG. 2).

At block 370*b*, while conducting the telephone conversation between the second user and the bot, the system provides, for output to the corresponding first phone, a notification for the first user to rejoin the telephone call. The notification for the first user can indicate that the second user has rejoined the call, and can include, for example, an audible and/or visual notification rendered at the corresponding first phone. Further, the synthesized speech output at block 360*b* can indicate that the first user has been notified that the second user has rejoined the telephone call. In some implementations, the notification can further include a transcription (and/or audio data corresponding thereto) of user utterances of the second user and/or synthesized speech of the bot subsequent to the second user rejoining the telephone call. Providing the notification for the first user to rejoin the telephone call is described in more detail herein (e.g., with respect to FIG. 2).

At block 380*b*, the system determines that the first user has rejoined the telephone call. The system can determine that the first user has rejoined the telephone call based on the corresponding first phone transitioning from a second state to a third state that indicates the first user is now an active participant in the conversation. Determining that the first user has rejoined the telephone call is described in more detail herein (e.g., with respect to FIG. 2).

At block 390*b*, based on determining that the first user has rejoined the telephone call, the system ceases conducting the telephone conversation between the second user and the bot. The bot can cease conducting of the telephone conversation in response to determining that the first user has rejoined the telephone call. In some implementations, if the bot is outputting synthesized speech when the first user rejoins the call, the bot can cease providing the synthesized speech upon concluding outputting of the synthesized speech and/or upon reaching a natural pause in the synthesized speech (e.g., similar to discussed in FIG. 1 with respect to pause inserter 142). Ceasing conducting of the telephone conversation is described in more detail herein (e.g., with respect to FIG. 2).

Figure 4:
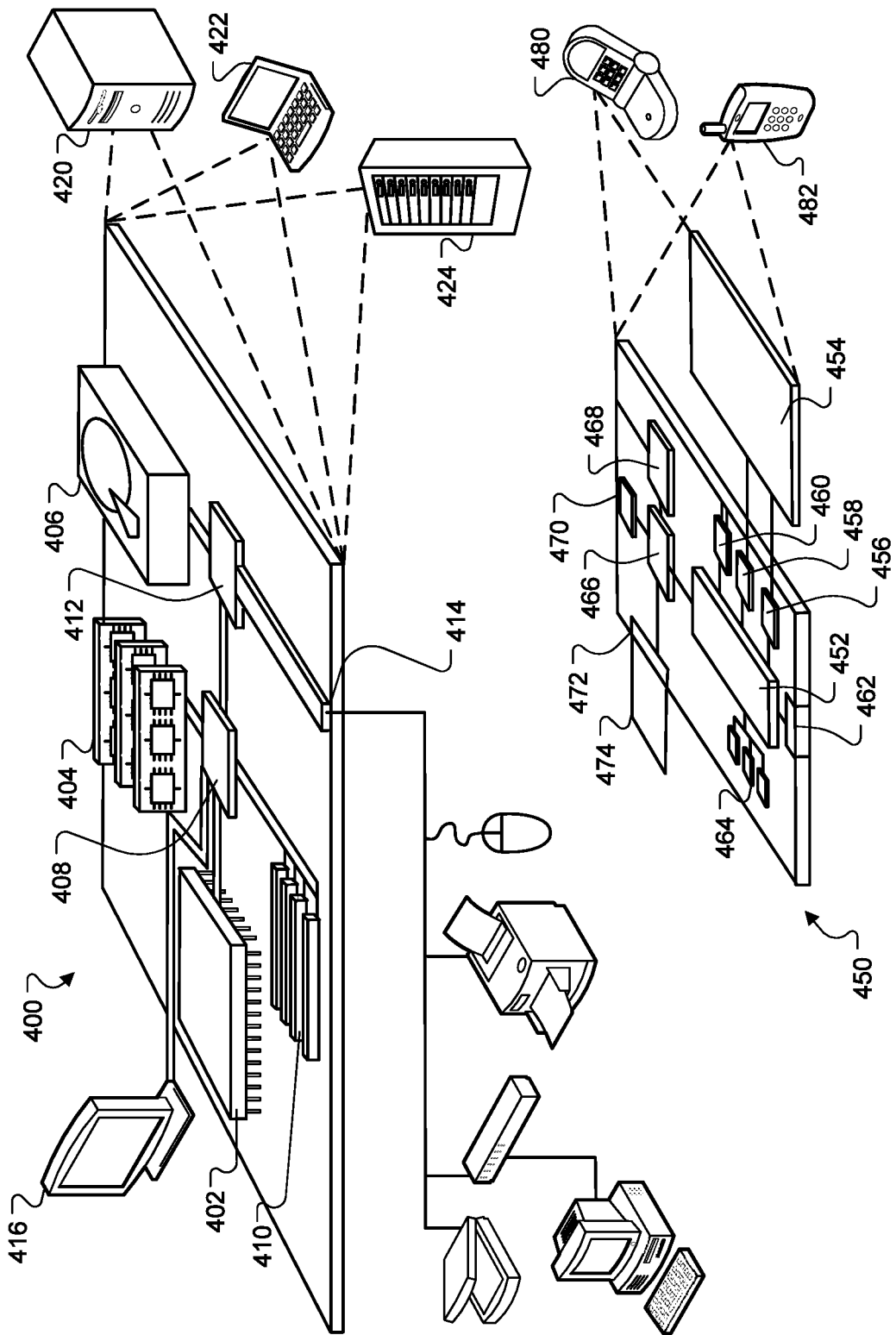
FIG. 4 is an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet. In some implementations, the systems and techniques described here can be implemented on an embedded system where speech recognition and other processing is performed directly on the device.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method implemented by one or more processors, the method comprising:
   determining that a first user and a second user are engaged in a telephone call, wherein the first user is associated with a corresponding first computing device, and wherein the second user is associated with a corresponding second computing device;
   determining that the second user has placed the first user on hold;
   determining that the first user has hung up the corresponding first computing device;
   in response to determining that the first user has hung up the corresponding first phone and while the first user is on hold:
      causing a bot, that is associated with the corresponding first computing device of the first user, to maintain the telephone call in an active state; and
      determining whether the second user has rejoined the telephone call; and
   in response to determining that the second user has rejoined the telephone call:
      causing the bot, that is associated with the corresponding first computing device of the first user, to continue the telephone call with the second user, wherein causing the bot associated with the corresponding first computing device of the first user to continue the telephone call with the second user comprises:
         causing the bot to generate synthesized speech of the bot that conveys one or more details with respect to the first user initiating the telephone call; and
         causing the bot to provide, for output at the corresponding second computing device of the second user, the synthesized speech of the bot;
      causing the bot to provide, for output at the corresponding first computing device, a notification for the first user to rejoin the telephone call;
      determining that the first user has rejoined the telephone call; and
      in response to determining that the first user has rejoined the telephone call:
         causing the bot to cease the telephone conversation with the second user.

2. The method of claim 1, wherein causing the bot associated with the corresponding first computing device of the first user to continue the telephone call with the second user further comprises:
   causing the bot to generate additional synthesized speech of the bot that indicates the first user is not an active participant on the telephone call; and
   causing the bot to provide, for output at the corresponding second computing device of the second user, the additional synthesized speech of the bot.

3. The method of claim 1, further comprising:
   in response to determining that the first user has not rejoined the telephone call:
      causing the bot associated with the corresponding first computing device of the first user to place the second user on hold.

4. The method of claim 3, further comprising:
   in response to determining that the first user has not rejoined the telephone call within a threshold duration of time of causing the bot associated with the corresponding first computing device of the first user to place the second user on hold:
      causing the bot to terminate the telephone call.

5. The method of claim 1, further comprising:
prior to the first user rejoining the telephone call, receiving, from the second user, a user utterance;
causing the bot to generate a transcription of the user utterance; and
causing the bot to include the notification for the first user to rejoin the telephone call in the transcription of the user utterance.

6. The method of claim 1, wherein maintaining the telephone call in the active state comprises:
muting one or more microphones of the corresponding first computing device; and
maintaining a telephonic connection between the corresponding first computing device and the corresponding second computing device.

7. The method of claim 6, in response to determining that the first user has rejoined the telephone call, further comprising:
unmuting the one or more microphones of the corresponding first computing device.

8. The method of claim 1, wherein the bot is implemented at a remote server that is remote from the first computing device.

9. The method of claim 1, wherein the bot is implemented locally at the first computing device.

10. A system comprising:
one or more processors; and
memory storing instructions that, when executed by the one or more processors, cause the one or more processors to:
determine that a first user and a second user are engaged in a telephone call, wherein the first user is associated with a corresponding first computing device, and wherein the second user is associated with a corresponding second computing device;
determine that the second user has placed the first user on hold;
determine that the first user has hung up the corresponding first computing device; and
in response to determining that the first user has hung up the corresponding first phone and while the first user is on hold:
cause a bot, that is associated with the corresponding first computing device of the first user, to maintain the telephone call in an active state; and
determine whether the second user has rejoined the telephone call; and
in response to determining that the second user has rejoined the telephone call:
cause the bot, that is associated with the corresponding first computing device of the first user, to continue the telephone call with the second user, wherein the instructions to cause the bot associated with the corresponding first computing device of the first user to continue the telephone call with the second user comprise instructions to:
cause the bot to generate synthesized speech of the bot that conveys one or more details with respect to the first user initiating the telephone call; and
cause the bot to provide, for output at the corresponding second computing device of the second user, the synthesized speech of the bot;
cause the bot to provide, for output at the corresponding first computing device, a notification for the first user to rejoin the telephone call;
determine that the first user has rejoined the telephone call; and
in response to determining that the first user has rejoined the telephone call:
cause the bot to cease the telephone conversation with the second user.

11. The system of claim 10, wherein the instructions to cause the bot associated with the corresponding first computing device of the first user to continue the telephone call with the second user comprise further instructions to:
cause the bot to generate additional synthesized speech of the bot that indicates the first user is not an active participant on the telephone call; and
cause the bot to provide, for output at the corresponding second computing device of the second user, the additional synthesized speech of the bot.

12. The system of claim 10, wherein the instructions further cause the one or more processors to:
in response to determining that the first user has not rejoined the telephone call:
cause the bot associated with the corresponding first computing device of the first user to place the second user on hold.

13. The system of claim 12, wherein the instructions further cause the one or more processors to:
in response to determining that the first user has not rejoined the telephone call within a threshold duration of time of causing the bot associated with the corresponding first computing device of the first user to place the second user on hold:
cause the bot to terminate the telephone call.

14. The system of claim 10, wherein the instructions further cause the one or more processors to:
prior to the first user rejoining the telephone call, receive, from the second user, a user utterance;
cause the bot to generate a transcription of the user utterance; and
cause the bot to include the notification for the first user to rejoin the telephone call in the transcription of the user utterance.

15. The system of claim 10, wherein the instructions to maintain the telephone call in the active state comprise instructions to:
mute one or more microphones of the corresponding first computing device; and
maintain a telephonic connection between the corresponding first computing device and the corresponding second computing device.

16. The system of claim 15, in response to determining that the first user has rejoined the telephone call, wherein the instructions further cause the one or more processors to:
unmute the one or more microphones of the corresponding first computing device.

17. A non-transitory computer-readable storage medium storing instructions that, when executed by one or more processors, cause the one or more processors to perform operations, the operations comprising:
determining that a first user and a second user are engaged in a telephone call, wherein the first user is associated with a corresponding first computing device, and wherein the second user is associated with a corresponding second computing device;
determining that the second user has placed the first user on hold;
determining that the first user has hung up the corresponding first computing device;

in response to determining that the first user has hung up the corresponding first phone and while the first user is on hold:
    causing a bot, that is associated with the corresponding first computing device of the first user, to maintain the telephone call in an active state; and
    determining whether the second user has rejoined the telephone call; and
in response to determining that the second user has rejoined the telephone call:
    causing the bot, that is associated with the corresponding first computing device of the first user, to continue the telephone call with the second user, wherein causing the bot associated with the corresponding first computing device of the first user to continue the telephone call with the second user comprises:
        causing the bot to generate synthesized speech of the bot that conveys one or more details with respect to the first user initiating the telephone call; and
    causing the bot to provide, for output at the corresponding second computing device of the second user, the synthesized speech of the bot;
    causing the bot to provide, for output at the corresponding first computing device, a notification for the first user to rejoin the telephone call;
    determining that the first user has rejoined the telephone call; and
    in response to determining that the first user has rejoined the telephone call:
        causing the bot to cease the telephone conversation with the second user.

* * * * *